United States Patent [19]

Nagler

[11] Patent Number: 5,440,539
[45] Date of Patent: Aug. 8, 1995

[54] METHOD OF CONTROLLING AN ELECTRICAL SWITCHING DEVICE IN RESPONSE TO A SIGNAL CONFIGURATION OF A SWITCHING SIGNAL

[75] Inventor: Werner Nagler, Schäftlarn, Germany

[73] Assignee: Siemens Aktiengesellschaft, Munich, Germany

[21] Appl. No.: 94,087

[22] PCT Filed: Jan. 9, 1992

[86] PCT No.: PCT/EP92/00030

§ 371 Date: Jul. 20, 1993

§ 102(e) Date: Jul. 20, 1993

[87] PCT Pub. No.: WO92/13429

PCT Pub. Date: Aug. 6, 1992

[30] Foreign Application Priority Data

Jan. 23, 1991 [EP] European Pat. Off. .......... 91100852

[51] Int. Cl.6 .................... H04J 3/14; H04Q 1/20
[52] U.S. Cl. ........................ 370/16; 371/20.1
[58] Field of Search ............ 370/16, 60, 58.1; 371/8.1, 8.2, 11.1, 11.2

[56] References Cited

U.S. PATENT DOCUMENTS

| | | | |
|---|---|---|---|
| 4,017,828 | 4/1977 | Watanabe et al. | 371/8.2 |
| 4,901,347 | 2/1990 | Schmidt et al. | 379/279 |
| 4,964,095 | 10/1990 | Tyrrell et al. | 370/16 |
| 5,138,609 | 8/1992 | Hashimoto | 370/16 |
| 5,146,453 | 9/1992 | Nagler et al. | 370/16 |
| 5,200,949 | 4/1993 | Kobayashi | 370/16 |
| 5,218,600 | 6/1993 | Schenkyr et al. | 371/8.2 |

FOREIGN PATENT DOCUMENTS 0360065 3/1990 European Pat. Off. .
0291791 11/1988 Germany .
9011235 10/1990 Germany .

OTHER PUBLICATIONS

"La Nouvelle Gamme De Centraux Temporels de CIT-Alcatel Systeme E10B", by Jean-Baptiste Jacob et al, Computation and Transmission, vol. 2, No. 2, Jul. 1980, pp. 77–96.

Primary Examiner—Douglas W. Olms
Assistant Examiner—Min Jung
Attorney, Agent, or Firm—Hill, Steadman & Simpson

[57] ABSTRACT

Until now static switching signals have been used for triggering a switching device. This has the disadvantage that such static switching signals controlled by an exciter device can also occur in the event of a failure of the exciter device and then may effect faulty control of the switching device. In order to avoid this disadvantage, the switching signal is such that the signal state of the switching signal which is intended to effect the switching into the protection-switching state coincides with the signal state occurring upon failure of the exciter device.

6 Claims, 2 Drawing Sheets

METHOD OF CONTROLLING AN ELECTRICAL SWITCHING DEVICE IN RESPONSE TO A SIGNAL CONFIGURATION OF A SWITCHING SIGNAL

BACKGROUND OF THE INVENTION

The invention relates to a method of controlling a switching device for switching between a normal switching state and a protection-switching state by a switching signal.

FIG. 1 shows a specific application of switching devices for two line trunk groups LTGX and LTGY of an exchange in a switching system, which are assigned to each other for the event of a protection switching of data streams DATX or DATY. The exchange has a plurality of such line trunk groups, assigned in each case in pairs, a dual central switching network SN, and a dual central processor CP.

The two line trunk groups LTGX and LTGY represented in each case have a processing unit ZTX and ZTY, respectively, in which the switching and controlling function of the line trunk group is realized. Furthermore, a line trunk group has interface modules DIU and SDC, which take care of connecting the line trunk group to the subscribers or other exchanges and to the central switching network, and which include in particular switching devices which can execute the protection switching of the data streams.

A more detailed description of the exchange represented in FIG. 1, and of the method in the event of a protection switching of the data stream of a line trunk group is to be found in European Patent Application EP-A10 291 791 corresponding to U.S. Pat. No. 4,901,347 hereby incorporated by reference. According to this European patent application, in the event of protection switching, but also during routine testing and also by manual input, the data stream, i.e. the entire processing channels with the exception of the signalling channels, are diverted via the assigned processing unit. This must be performed in a clock-controlled and phase-synchronous manner, as described in more detail in European Patent Application EP-A1 0 360 924 corresponding to U.S. Pat. No. 5,146,453 hereby incorporated by reference, and European Patent Application EP-A1 0 360 065 corresponding to U.S. Ser. No. 803,615 filed Dec. 9, 1991 hereby incorporated by reference, by the controlling of the signalling channel.

The switching device in the direction from and to the switching network is in this case accommodated on the interface module SDC independent of the respective control of the line trunk group, and is represented in FIG. 1 by a switch. The control of a switching device on the interface module SDC is effected by a switching signal, which can be emitted by the two mutually assigned processing units.

It is known to pass the switching signal as a static signal to the switching device and to execute the switching immediately.

This has the disadvantage that such a static switching signal can also occur in the event of a fault and prevents the required switching or, if switching has already taken place, wrongly effect switching back.

SUMMARY OF THE INVENTION

The invention is based on the object of specifying a method which ensures fault-free controlling of a switching device.

This object is achieved by a method of controlling a switching device for switching between a normal switching state and a protection-switching state by a switching signal. The switching device is controlled into a switching state corresponding to the signal state of the switching signal. The signal state of the switching signal is controlled by an exciter device (group processor) as a function of switching conditions monitored by the exciter device. The switching device is controlled into the protection-switching state if the switching signal assumes a static signal state. The switching device is controlled into the normal switching state if the switching signal assumes a pulse-shaped signal state.

The following are advantageous developments of the present invention.

The switching device is controlled into a switching state corresponding to the signal state of the switching state only when this signal state persists over a certain time. This has, in particular, the advantage of particular simplicity since, should the exciter device fail, generally a static signal state of the switching signal establishes itself.

The switching signal is generated by a pulse generating device and the pulse generating device is controlled by excitation pulses of the exciter device (group processor). The switching signal is controlled into the pulse-shaped signal state if the excitation pulses follow one another with sufficient density over time. The switching signal is controlled into the static signal state if the excitation pulses do not follow one another with sufficient density over time. This has, in particular, the advantage that brief changes of the signal state of the switching signal do not effect switching.

The switching signal is generated by the exciter device itself.

The power supply of the switching device is independent of the power supply of the exciter device.

The exciter device and switching device are switching devices which are constructionally and electrically separate from each other. This has, in particular, the advantage that, even in the event of a failure of the exciter device due to failure of the power supply, the switching device can carry out the switching operation.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 2:
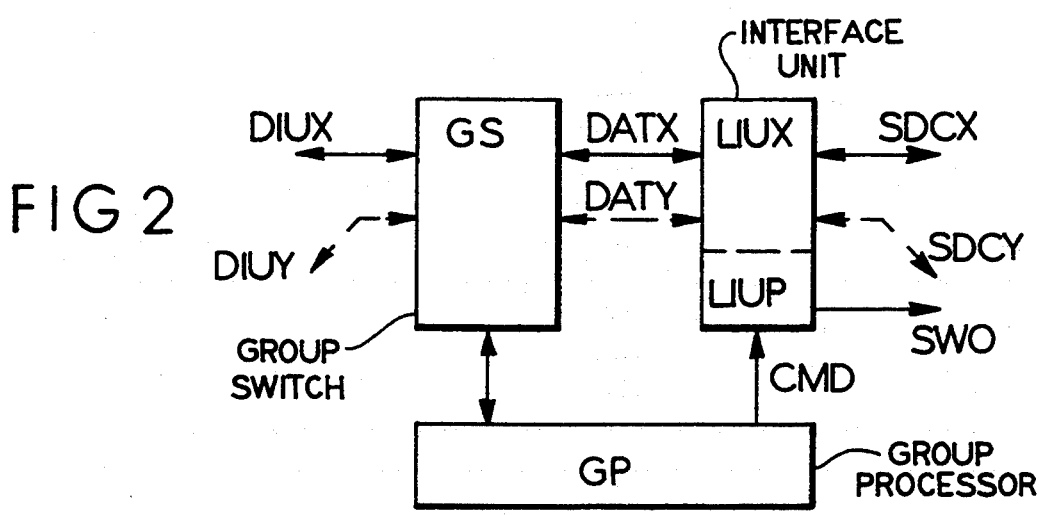
FIG. 2 shows the generation of a switching signal according to the invention in the processing unit of a line trunk group according to FIG. 1.
Figure 3:
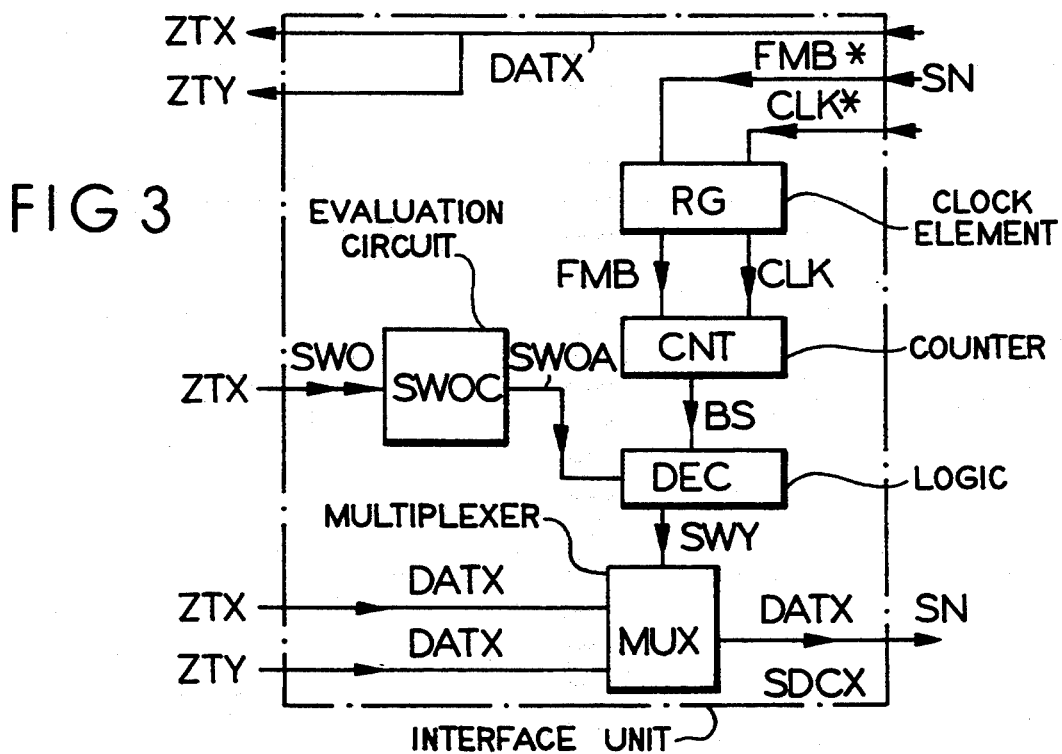
FIG. 3 shows an interface unit of a line trunk group in the direction of the central switching network for switching a data stream and for regeneration of the system clocks.
Figure 4:
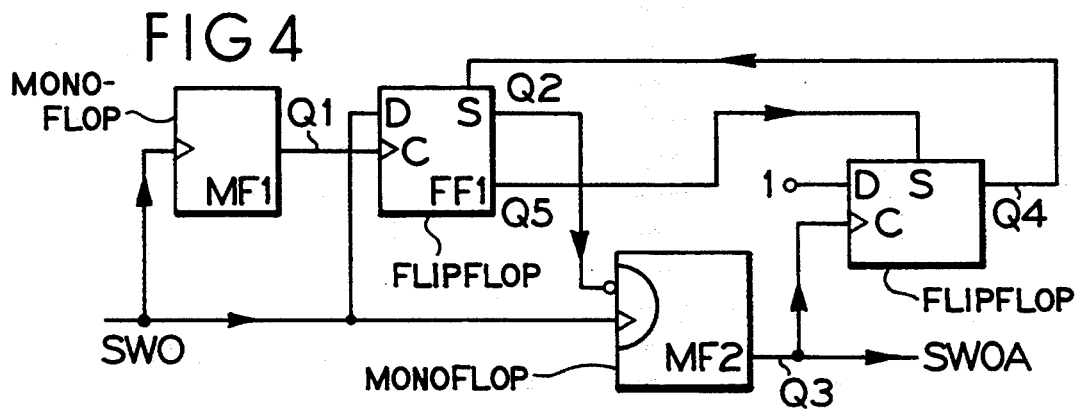
FIG. 4 shows an evaluation circuit of the switching device for monitoring the switching signal.

The explanation of an exemplary embodiment of the invention with reference to FIGS. 2 to 4 follows.

Figure 1:
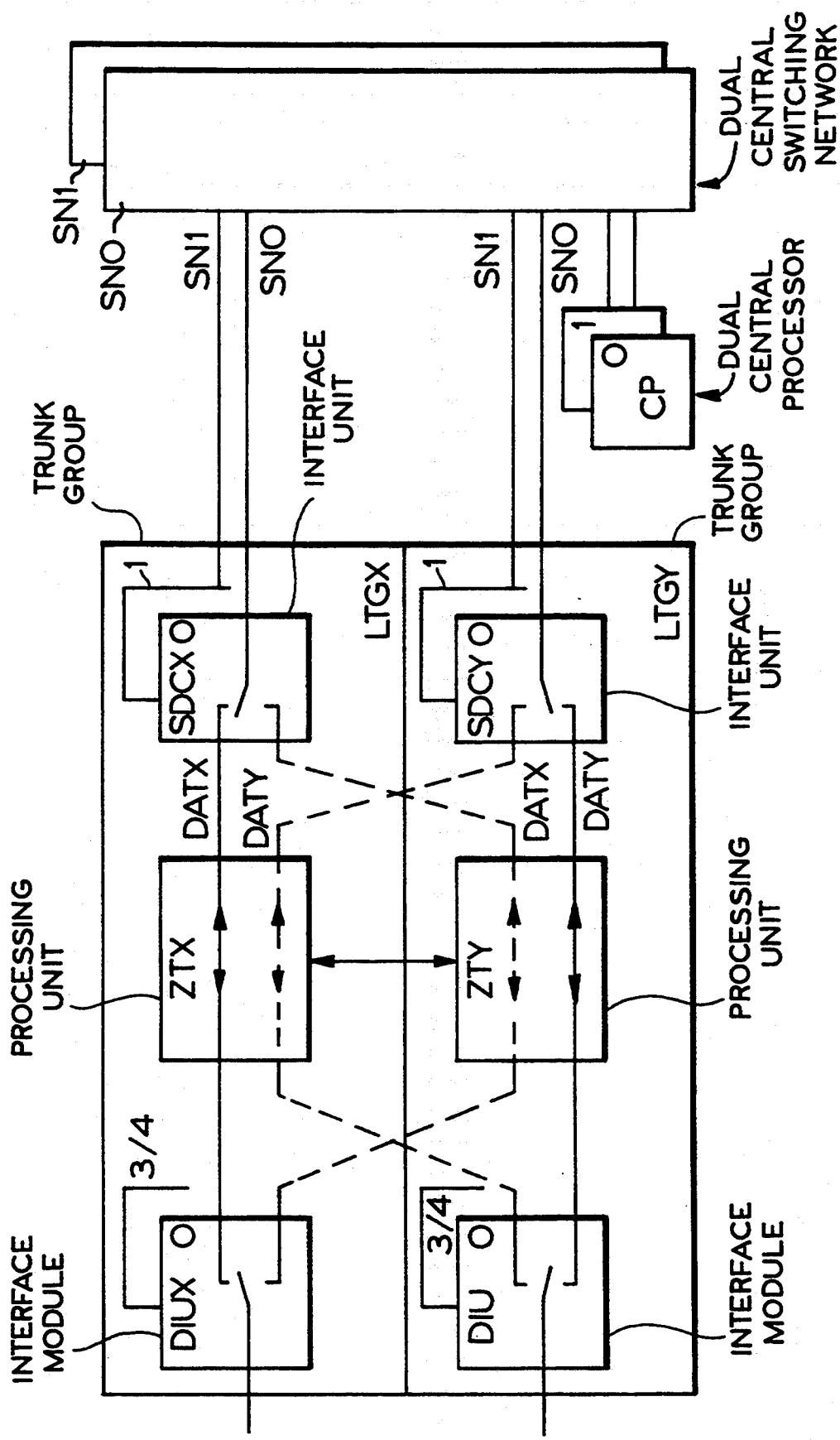
FIG. 1 shows a specific application of switching devices according to the prior art.

FIG. 2 shows the generation of a switching signal SWO according to the invention in the processing unit ZTX of the line trunk group LTGX according to FIG. 1.

The processing unit essentially has a group processor GP for realizing the control function, a group switch GS for realizing the switching function and an interface unit LIUX for connecting the processing unit ZTX to the interface units SDCX and SDCY, which represent the interfaces between the line trunk groups and the switching network.

The control function of the group processor GP includes, in particular, the function of an exciter device for generating an excitation signal CMD as a function of certain switching conditions. The switching signal SWO is generated in a control device LIUP of the interface LIUX. It is activated by the excitation signal CMD of the group processor. If the group processor is no longer able in certain fault cases actively to send the switching command, the control device LIUP switches the switching signal into a static signal state. For this purpose, a time monitoring of about 1 sec. is realized in the control unit LIUP and initiates the switching operation after absence of the excitation pulses of the excitation signal CMD.

In its active signal state, the switching signal SWO is a pulse-shaped signal having a period of 20 msec. and a pulse duty ratio of 1:1. Only in this active signal state is the dedicated control switched on. In the passive signal state, this switching signal SWO is either a static signal and is at logical 1 or logical 0, depending on the random switching time of the corresponding switching element of the control device LIUP, or the pulse-shaped switching signal does not have the required pulse duty ratio. As used herein a static signal is a signal having a substantially constant value during a predetermined time period or having a series of pulses wherein the series contains less than a predetermined number of pulses, whereas a pulse-shaped signal is a signal having a series of pulses during a predetermined time period wherein the series contains at least the predetermined number of pulses.

In the static signal state of the switching signal, the data path DATX according to FIG. 1 is always diverted to the partner line trunk group LTGY. The switching signal SWO is generated by the control device LIUP by means of a software timer. The control device LIUP can generate the passive signal state of the switching signal, for example by switching off the switching signal.

FIG. 3 shows the interface unit SDCX switching of the data stream DATX and for regeneration of the clocks CLK and FMB of the switching network SN, which for the sake of simplicity is referred to in the following as switching device SDCX.

The power supply of the switching device is independent of the power supply of the central unit ZCX, meaning that exciter device and switching device are electrically separate from each other, and the switching operation can be performed even upon failure of the power supply of the central unit. In addition, the exciter device is accommodated on a different module than the switching device, meaning that exciter device and switching device are also separate in a constructional respect.

The switching signal is monitored on the switching device SDCX by means of a specific evaluation circuit SWOC. To be more precise, the failure of the pulse signal or the occurrence of a static signal state, i.e. of a logical 0 or a logical 1, is monitored. Short disturbing pulses are eliminated. If the pulse-shaped switching signal is absent, the output of the evaluation circuit switches after about 60 msec from logical 0 to logical 1 and thereby initiates the switching operation.

Due to the special type of triggering of the switching device with the aid of the switching signal SWO, the switching device SDCX is able upon failure of the central unit ZTX to initiate and carry out the switching operation independently.

The output signal of the evaluation circuit SWOC does not effect the switching operation directly, since the signal occurs at any time, i.e. can also occur asynchronously with respect to the system clock.

In order that the actual switching can be executed exactly at a data byte limit, in addition a byte signal BS is required, which in each case changes its signal state in a certain direction, and consequently produces a certain edge, exactly at a data byte limit. This byte signal BS is derived in FIG. 3 with the aid of a counter CNT from the system clock CLK and the frame clock FMB. The frame clock signal FMB in this case takes care that the counter CNT is set at a certain counter reading at the beginning of each frame and, as a result, remains synchronized to the frame. Regenerator RG regenerates clock signals FMB and CLK from clock signals FMB* and CLK* that are supplied by the switching network SN.

A logic DEC generates the actual switching control signal SWY as a function of the asynchronous switching signal SWOA and of the byte signal BS. Finally, the state of the actual switching control signal SWY controls the switching state of a multiplexer MUX and consequently the through-connection of the data stream DATX, from the central unit ZTX or ZTY in the direction of the switching network SN.

FIG. 4 shows the evaluation circuit SWOC for monitoring the switching signal SW0. The evaluation circuit has a first one shot timer MF1 and a second one shot timer MF2, and also a first flipflop FF1 and a second flipflop FF2.

The triggering of the one shot timers and of the flipflops is performed in each case by a rising edge of the respective clock input signal. The flipflops are delay flipflops without through-connection delay.

As already explained, in its active signal state, the switching signal SW0 is a periodic signal having a pulse duration of 10 msec and a pulse space of the same length.

The first one shot timer MF1 and the first flipflop FF1 jointly monitor the switching signal for the defined pulse shape. The first one shot timer has an inherent delay of about 15 msec. The second one shot timer MF2 has an inherent delay of about 60 msec and serves for monitoring the pulse period of the switching signal, i.e. upon absence of a rising edge of the switching signal over a period of more than 60 msec switches the asynchronous switching signal SWOA from logical 0 to logical 1.

The first and second flipflops jointly take care firstly of resetting the evaluation circuit if the switching signal assumes a non-defined pulse-shaped or static signal state and secondly of suppressing disturbing pulses in the reset state, thereby preventing switching back of the data stream by means of the asynchronous switching signal SWOA.

In a normal case, the first one shot timer MF1 is triggered by the rising edge of the active switching signal SWO and switches the inverse output Q1 to logical 0. After elapse of the inherent delay of the first one shot timer of 15 msec, the first flipflop FF1 is triggered by the rising signal edge of the inverse output Q1. The first flipflop assumes the state of the switching signal via the input D to the output Q2. The signal of the output Q2 controls the input of the second one shot timer MF2. In a normal case, i.e. defined pulse duration of the switching signal, the second one shot timer MF2 is released, whereas in the case of a fault (for example pulse length greater than 15 msec, pulse space less than 5 msec) or in the case of testing (static switching signal) the second one shot timer MF2 is blocked.

By this controlling of the second one shot timer, the protection switching state can be initiated by means of the asynchronous switching signal SWOA if there is a passive switching signal SWO, i.e. an undefined pulse shape of the switching signal or a static switching signal SWO.

The second one shot timer MF2 monitors through its inherent delay of 60 msec the switching signal SWO for its periodic cycle. With the correct pulse cycle, the second one shot timer is constantly re-triggered and supplies a logical 0 at the inverse output Q3. If the second one shot timer is not re-triggered in this inherent delay, it falls back into its position of rest inversely (output Q3 to logical 1) and consequently initiates a switching of the data stream DATX asynchronously by means of the asynchronous switching signal SWOA.

The transition of the second one shot timer into its position of rest also supplies a rising signal edge at the clock input C of the second flipflop FF2 and consequently effects a setting of the first flipflop FF1 via the output Q4 and consequently a blocking of the input at the second one shot timer MF2. At the same time, the second flipflop FF2 is also set back again via the inverse output Q5 of the first flipflop FF1.

The evaluation circuit SWOC consequently assumes the state of rest if no pulses of a defined length or continuous signals arrive at the clock input of the second one shot timer. In this state, which is also assumed after voltage switching on, the second one shot timer supplies the asynchronous switching signal SWOA with the level logical 1 at the inverse output Q3 and thereby initiates switching of the data stream DATX. In addition, in this state of rest, the input of the second one shot timer MF2 is blocked by means of the first flipflop FF1. As a result, the first incoming pulse of the switching signal is accepted only in the first one shot timer and the first flipflop, whereas the second one shot timer is activated only by the second pulse of the switching signal. This switching measure achieves the effect of gating disturbing pulses, and preventing incorrect switching back of the data stream DATX.

The invention is not restricted to the protection switching of data streams. Instead of a data stream, for example a supply voltage signal could, in the event of failure, also be protection-switched in the way according to the invention.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method of controlling an electrical switching device for switching between at least two switching states, the two switching states being a normal switching state and a protection-switching state, by a switching signal, comprising the steps of:
   controlling the switching device such that the switching device is placed into a switching state of the two switching states in response to the switching signal, said switching signal having at least a static signal configuration and a pulse-shaped signal configuration;
   controlling the signal configuration of the switching signal by an exciter device as a function of switching conditions monitored by the exciter device;
   controlling the switching device such that the switching device is placed into the protection-switching state when the switching signal has a static signal configuration;
   controlling the switching device such that the switching device is placed into the normal switching state when the switching signal has a pulse-shaped signal configuration.

2. The method as claimed in claim 1, wherein in the first step of controlling the switching device the switching device is placed into a switching state assigned to a signal configuration of the switching signal only when this signal configuration exists for a predetermined time period.

3. The method as claimed in claim 1, wherein the method further comprises:
   generating the switching signal by a pulse generating device and controlling the pulse generating device by excitation pulses of the exciter device;
   generating the switching signal in the pulse-shaped signal configuration when the excitation pulses follow one another with at least a predetermined pulse density during a predetermined time period;
   generating the switching signal in the static signal configuration when the excitation pulses do not follow one another with at least the predetermined pulse density during the predetermined time period.

4. The method as claimed in claim 1, wherein the switching signal is generated by the exciter device itself.

5. The method as claimed in claim 1, wherein a power supply of the switching device is independent of a power supply of the exciter device.

6. The method as claimed in claim 1, wherein the exciter device and switching device are devices which are physically and electrically separate from each other.

* * * * *